United States Patent [19]

Yin et al.

[11] Patent Number: 5,069,308

[45] Date of Patent: Dec. 3, 1991

[54] LOW IMPEDANCE DOWN-HOLE ACOUSTIC SOURCE FOR WELL LOGGING

[75] Inventors: Hezhu Yin; Jerry M. Harris; Amos M. Nur, all of Stanford, Calif.

[73] Assignee: The Board of Trustees of the Leland Stanford Junior University, Stanford, Calif.

[21] Appl. No.: 611,926

[22] Filed: Nov. 13, 1990

[51] Int. Cl.$^5$ .......................... G01V 1/40; H01L 41/04
[52] U.S. Cl. ..................................... 181/106; 310/321
[58] Field of Search ............... 181/106, 102, 104, 113; 367/911, 912, 152, 159, 160, 161, 157; 310/321, 322, 328, 329, 330

[56] References Cited

U.S. PATENT DOCUMENTS

| | | | |
|---|---|---|---|
| 4,706,230 | 11/1987 | Inoue et al. | 367/159 |
| 4,754,441 | 6/1988 | Butler | 367/157 |
| 4,783,771 | 11/1988 | Paulsson | 367/57 |
| 4,869,349 | 9/1989 | Minear et al. | 181/102 |
| 4,949,316 | 8/1990 | Ketahara | 367/157 |

OTHER PUBLICATIONS

Toulis, W. J., "Design Problems for High Power Flextensional Transducers", *Journal of Underwater Acostics*, Appendix D, Soc. Am. 35, (1963).

*Primary Examiner*—Ian J. Lobo
*Attorney, Agent, or Firm*—Townsend and Townsend

[57] ABSTRACT

A low impedance acoustic source suitable for used in down-hole well logging includes a mechanical transformer for impedance matching of the source to the surrounding environment. Elliptically shaped flexible beams are positioned along the long axis of an ellipse, and a pump is oriented along the long axis of the ellipse for driving the flexible beams. In a preferred embodiment the pump comprises first and second stacks of transducers which engage the flexible beams at opposing ends with the two stacks of transducers operating in a push-pull mode of operation. Rigid extension at opposing ends of the flexible beams function as levers in translating the motion of the transducers to the flexible beams. A rigid support rod is positioned along the long axis of the ellipse in engagement with the rigid extensions at fulcrum points, and an adapter associated with each stack of ceramic transducers engages and drives the rigid members about the fulcrum point. In a preferred embodiment the flexible beams permit fluid to flow around the beams for pressure equalization in deep hole applications.

17 Claims, 3 Drawing Sheets

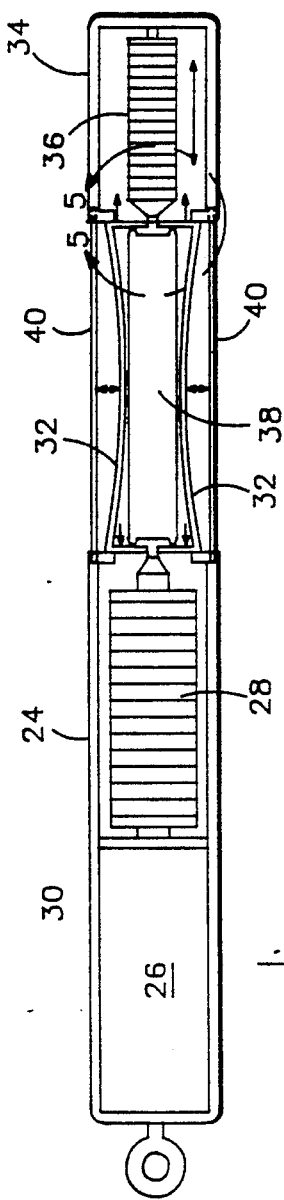
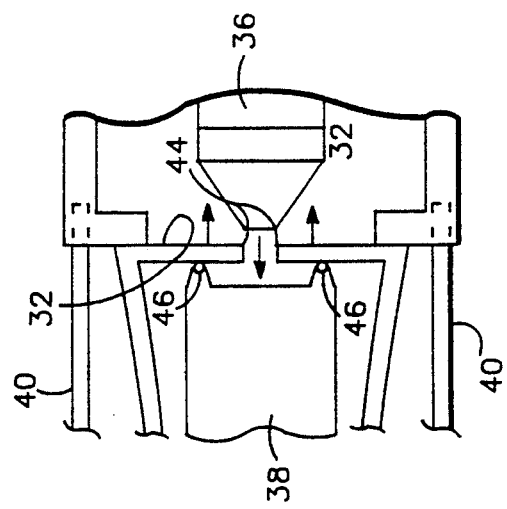
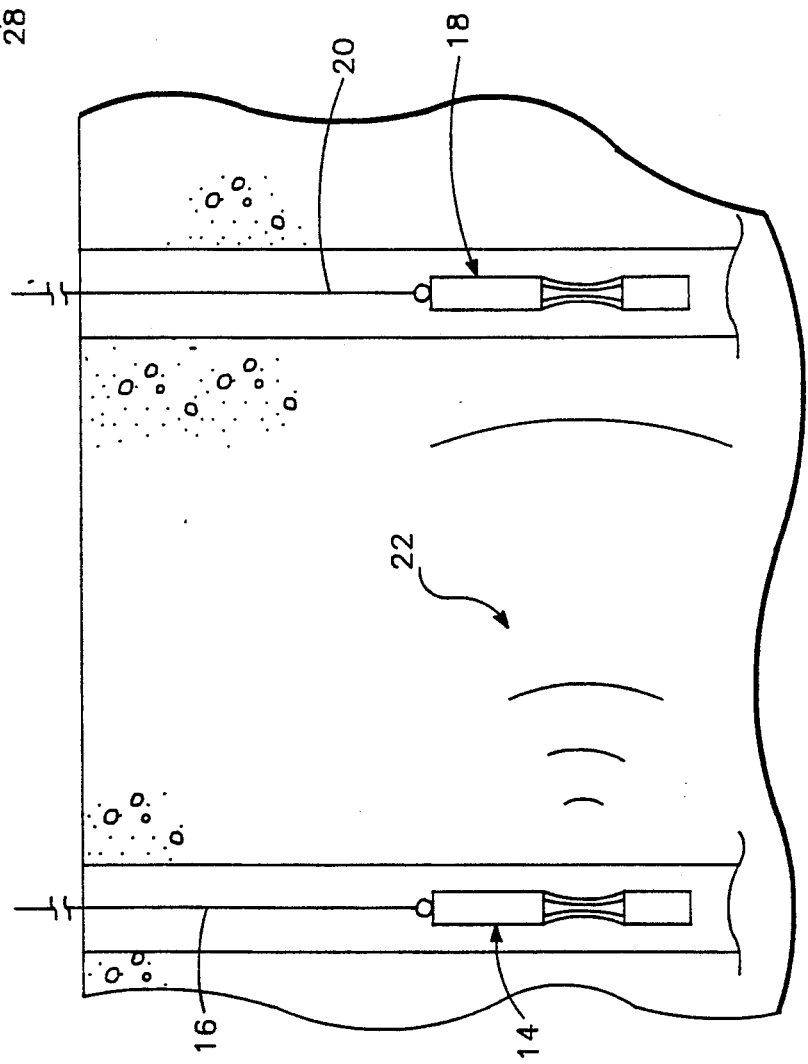
FIG.-2
FIG.-5
FIG.-1

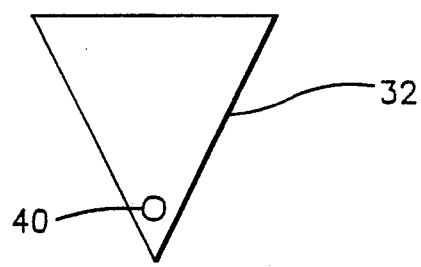
FIG.—3A
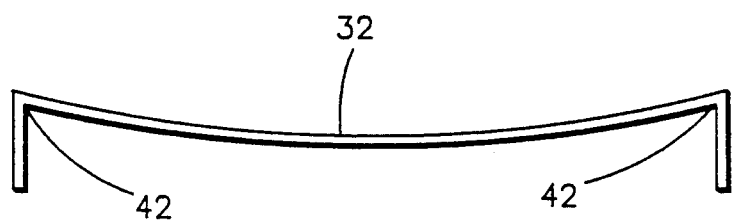
FIG.—3B
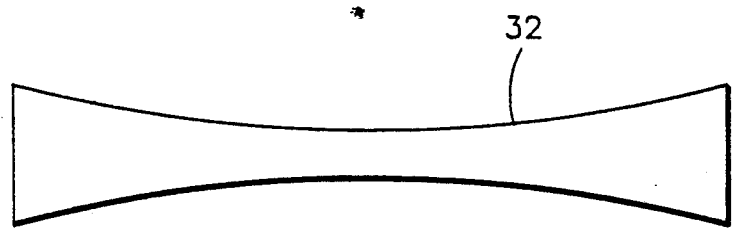
FIG.—3C
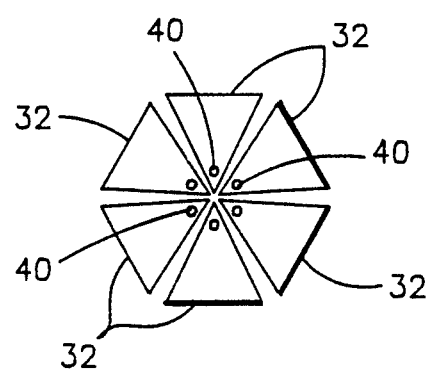
FIG.—4

LOW IMPEDANCE DOWN-HOLE ACOUSTIC SOURCE FOR WELL LOGGING

BACKGROUND OF THE INVENTION

This invention relates generally to acoustic wave transmitters, and more particularly the invention relates to a low impedance acoustic source suitable for use in down-hole well logging.

Acoustic wave transmitters are used in various applications such as underwater wave transmitters in sonar applications, for example, and in down-hole acoustic well logging. The advent of new piezoelectric and structural materials and solid state electronic devices has lead to substantial improvements in down-hole acoustic transducer performance with regard to frequency range, sensitivity, depth of submersion, and power output. Theory has kept abreast of these developments, particularly in revealing the significance of hole wave forms. This is especially true in the single well acoustic well logging field.

A critical problem especially in cross well logging is impedance matching of the acoustic source to the media. Acoustic impedance is defined as:

$$\frac{P}{u} = \rho V \quad (1)$$

Where;
P: Pressure;
u: particle velocity;
p: density;
V: acoustic velocity.

Common piezoelectric ceramics, like PZT-4, has the acoustic impedance $V_1 \times \rho = 4.6 \times 10^3 \text{m/s} \times 7.5 \times 10^3 \text{kg/m}^3 = 34.5 \times 10^6 \text{kg/s·m}^2$, which is about 20 times larger than acoustic impedance of bore hole mud; therefore, the coupling of acoustic energy is not well matched.

One way to lower the impedance is to change u and P, since the density $\rho$ and the acoustic velocity V have been set in the way of manufacturing. A kind of piezoelectric crystal has its fixed acoustic impedance, while u and P could be changed by means of a suitable mechanical transformer.

Particle velocity can be defined in terms of displacement, $\Delta x$, and crystal frequency, f, as follows:

$$u = \frac{\Delta x}{T} = \Delta x \cdot f \quad (2)$$

The piezoelectric crystal frequency f is also fixed for a specific crystal, and too high frequency will cause the phenomenon of cavitation especially in the water medium at the vibrating surface of the transducer.

Accordingly, an object of the present invention is an improved acoustic source.

Another object of the invention is a low impedance down-hole acoustic source for well logging.

A feature of the invention is a mechanical transformer which increases particle velocity.

Another feature of the invention is a symmetrical compliant metal mechanical transformer for matching impedances.

Yet another feature of the invention is a free-flooded cavity structure for deep well submergence.

SUMMARY OF THE INVENTION

In accordance with the invention a suitable mechanical pump is utilized to drive a plurality of beam members which have a generally elliptical shape. The pump moves along a long axis of an ellipse whereby enlarged displacement is realized along the short axis. The beam members, arranged along elliptical surfaces about the long axis realize the enlarged displacement in response to the pump action.

In a preferred embodiment, the pump comprises two stacks of ceramic transducers which are mounted on a support means at opposing ends of the beam members with the support means extending along the long axis of an ellipse. The beam members are mechanically coupled to the two stacks of ceramic transducers and exert a compressive force thereon. When actuated, the transducers drive the beam members in a push-pull mode along the long axis thereby realizing the enlarged displacement of the beam members along the short axis with respect to the displacement of the transducers.

In a well logging configuration, the ceramic transducer elements and the electronics for driving the transducers are sealed in an assembly, while the beam members are open and permit free flooding of borehole mud. In deep well applications this sustains high pressure.

The invention and objects and features thereof will be more readily apparent from the following detailed description and appended claims when taken with the drawing.

BRIEF DESCRIPTION OF THE DRAWING

FIG. 1 is an illustrative view of cross well logging using an acoustic source in accordance with one embodiment of the invention.

FIG. 2 is a section view of the acoustic source illustrated in FIG. 1 in accordance with one embodiment of the invention.

FIG. 3A, FIG. 3B, and FIG. 3C are an end view, a side view, and a top view, respectively, of a beam member.

FIG. 4 is an end view of six beam members as used in one embodiment of the invention.

FIG. 5 is a section view illustrating the engagement of a transducer unit with two beam members.

DETAILED DESCRIPTION OF ILLUSTRATIVE EMBODIMENTS

Figure 6:
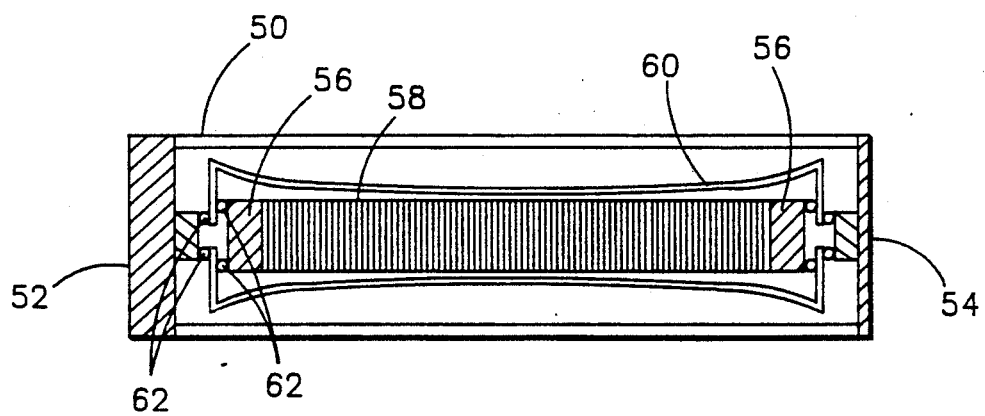
FIG. 6 is a section view of another embodiment of the acoustic source and pump in accordance with the invention.

Referring now to the drawing, FIG. 1 is an illustrative view of cross well logging. The two wells, 10 and 12, may be separated by more than one kilometer. In the first well 10 a transducer source 14 is suspended from a support cable 16, and in the second well 12 a receiving transducer 18 is suspended from a cable 20. Ultrasonic waves 22 emitted from the transmitting unit 14 pass through rock formations between the two wells and are received by the receiver 18. Analysis of the received signals reveals information on the structure of the rock formations. In a down-hole well logging application, the transducers generate 10-50 millisecond pulses at a repetition rate of 10-30Hz in response to 1,000volt pulses applied thereto.

Since the two wells may be separated by more than one kilometer, the power output of the source and the sensitivity of the receiver are very limited, particularly due to impedance problems. The present invention provides a new and improved mechanical transformer for matching the impedances of the transmitting and receiving units to the intermediate ground and rock formation.

FIG. 2 is a section view of an acoustic source in accordance with one embodiment of the invention. The source includes a first cylindrical housing unit 24 in which is a hermetically sealed electronic cell 26. A first ceramic transducer unit 28 is mounted on a base plate 30 and engages end portions of beam members 32. A second cylindrical housing unit 34 houses a second ceramic transducer translator unit 36 which is supported between an end of the housing 34 and end portions of the beam members 32. When exposed to a deep well environment the housing members are preferably made of stainless steel. A support rod 38 engages opposing end portions of the beam members 32 opposite from the translators 28 and 36.

Rods 40 threadably engage housings 24 and 34 and maintain the elliptical beam members 32 in compression. The beam members are selected to have a single mode vibration and suppress multiple modes of vibration by proper selection of spring constant and coefficient of elasticity. Number 435 stainless steel has been used.

Importantly, the beam members 32 have generally elliptical configurations, and the translators 28 and 36 and the support rod 38 are aligned on a long axis of the ellipse. The piezoelectric transducers produce 30,000 newtons of force on the beam members. Such transducer elements are obtainable from Physik Instrument GMBH of Germany. The support member 38 must be able to withstand this applied force. The two translators 28, 36 drive the end portions of the beam members in a push-pull fashion, and the displacement of the translators is amplified along the short axis of the ellipse with movement of the beam members as indicated, thereby generating the ultrasonic waves. The beam members are elliptically configured inwardly rather than outwardly to focus the generated wave into the borehole wall.

FIGS. 3A, 3B, and 3C are an end view, a side view, and top view, respectively of one of the beam members 32 of FIG. 2. The end portion has a generally equilateral triangular configuration with a ball socket 40 provided thereon. The translators 28, 36 and the support rod 38 engage the end portions of the beam members in a ball and socket arrangement as will be described further with respect to FIG. 5. The central portion of the beam member is elliptical in configuration as illustrated in FIG. 3B. The end portion of the beam member is preferably a separate metal portion which is welded to the central portion at 42. The top configuration of a beam member can be rectangular but is preferably thinner in the middle portion as illustrated in FIG. 3C. This facilitates the positioning of a plurality of assembled beam members in the structure. In the illustrative embodiment six beam members are provided as illustrated in the end view of the assembled beam members of FIG. 4.

FIG. 5 is an enlarged view in section of the end portion of the translator 36, support rod 38, and two beam members 32. As noted above, the various components have sockets formed therein whereby balls are provided therein to facilitate the engagement of the various members. The balls 46 positioned between the support rod 38 and the beam members 32 functions as a fulcrum as the translator 36 moves the end portion of the beam members 32. Such action is discussed in U.S. Pat. No. 4,706,230. By suitable dimensioning by the lever arms on either side of the fulcrum defined by balls 46, a mechanical advantage is gained in driving the beam members by the translators.

FIG. 6 is a section view of another embodiment of the invention. Clamps 50 are affixed to a source end plug 52 and to end plug 54 which includes a connector to a power supply cell (not shown). Stack end plugs 56 are provided at either end of a PZT stack 58. Vibration beams 60 are positioned around the stack 58, and ball bearings 62 provide the joints for the levers. Thus, in this embodiment a single stack of PZT ceramic disks comprise the pump for the beams 60. The beams 60 can have the same configuration as shown in FIGS. 3A–3C and FIG. 4.

A mathematical analysis of the mechanical transformer in accordance with the invention follows. The mathematics is based on an ellipse which has the well known formula in cartesian coordinates as:

$$\frac{x^2}{a^2} + \frac{y^2}{b^2} = 1 \tag{3}$$

Or in terms of x $$y = \pm \frac{b}{a} \sqrt{a^2 - x^2} \tag{4}$$

Differentiate (2), we have $$y' = \pm \frac{b}{a} \frac{x}{\sqrt{a^2 - x^2}} \tag{5}$$

Assume the circumference of the elliptic will not change, when a has an increment $\Delta a$ and b has an increment $\Delta b$, then the problem is imposed to find the circumference of the elliptics.

By means of line integral, we have the circumference of the elliptics $$S = 4 \int_0^a \sqrt{1 + (y')^2} \, dx \tag{6}$$

Insert (3) into (4), we have $$S = 4 \int_0^a \sqrt{1 + \frac{b^2 x^2}{a^2(a^2 - x^2)}} \, dx \tag{7}$$

By defining $x = at$, and $K =$ $$K = \sqrt{1 - (b/a)^2} \text{ , we have}$$

$$S = 4a \int_0^1 \frac{dt}{\sqrt{(1 - t^2)(1 - K^2 t^2)}} - \tag{8}$$

$$4aK^2 \int_0^1 \frac{t^2 dt}{\sqrt{(1 - t^2)(1 - K^2 t^2)}}$$

So far, mathematicians haven't found the analytical solution to (6), while the numerical approximation could be found in most elliptical integral Handbooks on the above first kin and second kind elliptical integrals, and the combined solution is:

$$S = 4aE\left(\frac{\pi}{2}, k\right) = 4a\left\{\frac{\pi}{2}\left[1 - \left(\frac{1}{2}K\right)^2 - \left(\frac{1\cdot 3}{2\cdot 4}\right)\frac{K^4}{3} - \left(\frac{1\cdot 3 \cdot 5}{2\cdot 4\cdot 6}\right)^2 \frac{K^6}{5} \ldots\right]\right\} \quad (9)$$

The increment $\Delta v$ caused by increment $\Delta x$

Suppose we just use the first order term in (7), which causes 4% relative error when $a = 5b$, then we have $$S \approx 4a\left[\frac{\pi}{2}\left(1 - \frac{1}{4}K^2\right)\right] = \frac{\pi}{2}\left[3a + \frac{b^2}{a}\right] \quad (10)$$

If we assume the circumference does not change when the elliptic long axis has the increment $\Delta a$, then we have $$\frac{\pi}{2}\left[3(a + \Delta a) + \frac{(b + \Delta b)^2}{a}\right] = \frac{\pi}{2}\left[3a + \frac{b^2}{a}\right] \quad (11)$$

By algebra, we have $$3a \cdot \Delta a + 2b \cdot \Delta b + \Delta b^2 = 0 \quad (12)$$

Simply ignore the second order term, we get:

$$\Delta b = -\frac{3a}{2b}\Delta a \quad (13)$$

e.g., $$\Delta y|_{max} = -\frac{3a}{2b}\Delta x|_{max} \quad (14)$$

In (12), $\Delta x$ would be induced by the displacement of PZT crystal, and $\Delta y$ would be the elliptic shaped transducer's displacement in the short axis direction.

Formula (12) shows that the larger the ratio of $a/b$, the greater the $\Delta b$ or $\Delta y$ is. But the ratio must be limited by the material's elastic rigidity, the pressure range of the target environment, and the thermal limitations of the crystal and the elliptical ring.

There has been described an improved low impedance acoustic source employing a mechanical transformer for impedance matching of the source to its surrounding environment.

While the invention has been described with reference to a specific embodiment, the description is illustrative of the invention and is not to be construed as limiting the invention. For example, while the mechanical pump has been described as employing ceramic transducer elements, other mechanical pumps such as hydraulic and pneumatic pumps can be employed. Thus, various modifications and applications may occur to those skilled in the art without departing from the true spirit and scope of the invention as defined by the appended claims.

We claim:

1. A low impedance acoustic source comprising a plurality of flexible beams with each beam having a generally elliptical configuration, said flexible beams being positioned around the long axis of an ellipse, pump means positioned along said long axis, and means coupling said pump means to said plurality of flexible beams wherein incremental movement ($\Delta x$) of said pump mans along said long axis produces an incremental movement ($\Delta y$) of said flexible beams along the short axis of the ellipse, $\Delta y$ being related to $\Delta x$ as follows:

$$\Delta y = -1.5\, a/b \cdot \Delta x$$

Where:
a: Long axis;
b: short axis;
$\Delta x$: the maximum displacement along the long axis;
$\Delta y$: the maximum displacement along the short axis;

2. The low impedance acoustic source as defined by claim 2 wherein said pump means comprises a stack of ceramic transducers.

3. The low impedance acoustic source as defined by claim 2 wherein said pump means includes first and second stacks of transducers and means for supporting said first and second stacks of ceramic transducers at opposing ends of said flexible beams, said first and second stacks of transducers driving said flexible means in a push-pull mode of translation.

4. The low impedance acoustic source as defined by claim 3 wherein said flexible beams include rigid extensions at either end oriented generally perpendicular to said long axis, said means coupling said first and second stacks of transducers to said flexible beams including a support rod along the long axis of the ellipse and engaging points on the inner surfaces of said extensions, and each stack of transducers engaging points on the outer surfaces of said extensions.

5. The low impedance acoustic source as defined by claim 4 wherein said points on the inner surfaces of said extensions function as fulcrums whereby said extensions function as levers in translating motion of said transducers to said flexible beams.

6. The low impedance acoustic source as defined by claim 4 and including a ball at each point of engagement on said extensions.

7. The low impedance acoustic source as defined by claim 4 and further including a first housing for said first stack of transducers and a second housing for said second stack of transducers, rod means joining said first and second housings with said flexible beams between said first and second housings.

8. The low impedance source as defined by claim 7 and further including an electronic cell sealed within said first housing, and means electrically connecting said electronic cell to said first stack of transducers and to said second stack of transducers.

9. The low impedance source as defined by claim 6 wherein said flexible beams permit fluid to circulate around said beams for pressure equalization.

10. The low impedance acoustic source as defined by claim 2 wherein said flexible beams include rigid extensions at either end oriented generally perpendicular to said long axis, said stack of ceramic transducers being positioned along said long axis with said flexible beams positioned around said stack of ceramic transducers, and each end of said stack of ceramic transducers engaging points on the inner surfaces of said extensions.

11. The low impedance acoustic source as defined by claim 10 wherein said points on the inner surfaces of said extensions function as fulcrums whereby said extensions function as levers in translating motion of said transducers to said flexible beams.

12. The low impedance acoustic source as defined by claims 11 and including a ball at each point of engagement on said extensions.

13. A low impedance down-hole source for use in well logging comprising a first stack of ceramic transducers oriented along the long axis of an ellipse, a first housing for said first stack of ceramic transducers, a second stack of ceramic transducers oriented along said long axis of an ellipse, a second housing for said second stack of ceramic transducers, a plurality of support members engaging said first and second housings and maintaining said first and second housings in spaced relationship, a plurality of flexible beams with each beam having a generally elliptical configuration, said flexible beams being positioned in compression around said long axis between said first and second housings, each of said flexible beams including rigid extensions at either end thereof and oriented perpendicular to said long axis, a support rod positioned along said long axis and engaging points on the inner surfaces of said extensions, and each stack of transducers engaging points on the outer surfaces of said extensions.

14. The low impedance down-hole source as defined by claim 13 wherein said points on the inner surfaces of said extensions function as fulcrums whereby said extensions function as levers in translating motion of said transducers to said flexible beams.

15. The low impedance down-hole source as defined by claim 14 and including a ball at each point of engagement of said extensions.

16. The low impedance down-hole source as defined by claim 13 and further including an electronic cell hermetically sealed within said first housing and means electrically connected said electronic cell to said first stack of ceramic transducers and to said second stack of ceramic transducers.

17. A low impedance down-hole source for use in well logging comprising a stack of ceramic transducers oriented along the long axis of an ellipse, a plurality of flexible beams with each beam having a generally elliptical configuration, said flexible beams being positioned around said stack of ceramic transducers, each of said flexible beams including rigid extensions at either end thereof and oriented perpendicular to said long axis, each end of said stack of transducers engaging points on the inner surfaces of said extensions, and means for maintaining said flexible beams in compression.

* * * * *

UNITED STATES PATENT AND TRADEMARK OFFICE
CERTIFICATE OF CORRECTION

PATENT NO. : 5,069,308

DATED : December 3, 1991

INVENTOR(S) : Hezhu Yin; Jerry M. Harris; Amos M. Nur

It is certified that error appears in the above-identified patent and that said Letters Patent is hereby corrected as shown below:

```
Col. 1, line 21, change "hole" to --whole--;
Col. 3, line 38, change "ultrasonic" to --acoustic--;
Col. 4, line 29, change "(2)" to --(4)--;
Col. 4, line 46, change "(3) and (4)" to --(5) and (6)--;
Col. 4, line 53, delete "K =";
Col. 4, line 65, change "(6)" to --(8)--;
Col. 4, line 67, change "kin" to --kind--;
Col. 5, line 11, delete in its entirety;
Col. 5, line 12, change "first" to --second--;
                change "(7)" to --(9)--;
Col. 5, line 41, change "(12)" to --(14)--;
Col. 5, line 44, change "(12)" to --(14)--;
```

UNITED STATES PATENT AND TRADEMARK OFFICE
CERTIFICATE OF CORRECTION

PATENT NO. : 5,069,308            Page 2 of 2
DATED : December 3, 1991
INVENTOR(S) : Hezhu Yin, et al It is certified that error appears in the above-indentified patent and that said Letters Patent is hereby corrected as shown below:

Col. 6, line 6, change "mans" to --means--.

Signed and Sealed this

Thirty-first Day of August, 1993

Attest:

BRUCE LEHMAN

Attesting Officer      Commissioner of Patents and Trademarks